(12) United States Patent
Park

(10) Patent No.: US 7,714,971 B2
(45) Date of Patent: May 11, 2010

(54) LIQUID CRYSTAL DISPLAY

(75) Inventor: Min Sang Park, Ulsan (KR)

(73) Assignee: Samsung Mobile Display Co., Ltd., Yongin (JP)

( * ) Notice: Subject to any disclaimer, the term of this patent is extended or adjusted under 35 U.S.C. 154(b) by 763 days.

(21) Appl. No.: 11/545,995

(22) Filed: Oct. 10, 2006

(65) Prior Publication Data

US 2007/0132932 A1    Jun. 14, 2007

(30) Foreign Application Priority Data

Dec. 8, 2005    (KR) .................... 10-2005-0119867

(51) Int. Cl.
*G02F 1/1345*    (2006.01)
*G02F 1/1339*    (2006.01)

(52) U.S. Cl. .................. 349/149; 349/151; 349/155

(58) Field of Classification Search .............. None
See application file for complete search history.

(56) References Cited

U.S. PATENT DOCUMENTS

| 2002/0109803 A1* | 8/2002 | Yu et al. ................ 349/58 |
| 2003/0227593 A1* | 12/2003 | Miki et al. ............ 349/151 |
| 2004/0125263 A1 | 7/2004 | Lee |

FOREIGN PATENT DOCUMENTS

| JP | 07-049487 | 2/1995 |
| JP | 09-179131 | 7/1997 |
| JP | 9-311341 | 12/1997 |
| JP | 2001-13892 | 1/2001 |
| JP | 2001-94233 | 4/2001 |
| JP | 2001-100234 | 4/2001 |
| JP | 2003-084292 | 3/2003 |
| JP | 2005-070657 | 3/2005 |
| KR | 2001-0035877 | 5/2001 |
| KR | 2002-0088093 | 11/2002 |
| KR | 10-2005-0058907 | 6/2005 |

OTHER PUBLICATIONS

Patent Abstracts of Japan, Publication No. 09-311341, dated Dec. 2, 1997, in the name of Satoshi Hirose et al.
Patent Abstracts of Japan, Publication No. 2001-013892, dated Jan. 19, 2001, in the name of Takeshi Yoshino.
Patent Abstracts of Japan, Publication No. 2001-094233, dated Apr. 6, 2001, in the name of Koichi Miyasaka.

(Continued)

*Primary Examiner*—Tina M Wong
(74) *Attorney, Agent, or Firm*—Christie, Parker & Hale, LLP

(57) ABSTRACT

A liquid crystal display (LCD) capable of preventing spots from being generated by difference in brightness caused by variation in a gap between substrates is provided. The LCD includes a first pad unit positioned on an upper corner of a lower substrate, a second pad unit positioned on a lower corner of the lower substrate diagonally across from the first pad unit, an integrated circuit electrically connected to the first pad unit and the second pad unit, and dummy pads positioned on the other upper corner of the lower substrate. The dummy pads are substantially symmetrical with second pads included in the second pad unit thus helping maintain the gap between the substrates uniform.

15 Claims, 4 Drawing Sheets

OTHER PUBLICATIONS

Patent Abstracts of Japan, Publication No. 2001-100234, dated Apr. 13, 2001, in the name of Yoshifumi Kobayashi.
Korean Patent Abstracts, Publication No. 1020010035877 A, dated May 7, 2001, in the name of U Hyeok Choi et al.
Korean Patent Abstracts, Publication No. 1020020088093A, dated Nov. 27, 2002, in the name of Jae Wan Ko.
Korean Patent Abstracts, Publication No. 1020050058907 A, dated Jun. 17, 2005, in the name of Jun Su Kim.
Japanese Office action dated Jun. 9, 2009, for corresponding Japanese application 2006-129192, noting listed reference in this IDS.
Japanese Office action dated Dec. 22, 2009, for corresponding Japanese application 2006-129192, noting listed references in this IDS.

* cited by examiner

LIQUID CRYSTAL DISPLAY

CROSS-REFERENCE TO RELATED APPLICATION

This application claims priority to and the benefit of Korean Patent Application No. 10-2005-0119867, filed on Dec. 08, 2005, in the Korean Intellectual Property Office, the entire content of which is incorporated herein by reference.

BACKGROUND

1. Field of the Invention

The present invention relates to a liquid crystal display, and more particularly to, a liquid crystal display capable of preventing spots from being generated by difference in brightness of various regions of the display.

2. Discussion of Related Art

Recently, various flat panel displays (FPDs) having a lower weight and volume than cathode ray tubes (CRTs) have been developed. The FPDs include liquid crystal displays (LCDs), field emission displays (FEDs), plasma display panels (PDPs), and organic light emitting displays (OLEDs).

Among the FPDs, the LCDs are small and light and have low power consumption. Therefore, the LCDs have been in the spotlight as substitutes that can overcome the disadvantages of the conventional CRTs. Currently, the LCDs are used in large monitors and TVs as well as in portable devices such as mobile telephones and personal digital assistants (PDA). Passive matrix LCDs having low power consumption are often used for portable display devices.

FIG. 1 illustrates a conventional passive matrix LCD.

Referring to FIG. 1, the conventional passive matrix LCD includes a liquid crystal panel 2, a data driver 8 for driving data lines D1 to Dm of the liquid crystal panel 2, and a scan driver 6 for driving scan lines S1 to Sn of the liquid crystal panel 2.

The liquid crystal panel 2 includes pixels 4 positioned where the scan lines S1 to Sn and the data lines D1 to Dm cross over one another. The pixels 4 are selected when scan signals are supplied to the scan lines S1 to Sn to emit light components corresponding to data signals supplied to the data lines D1 to Dm.

The scan driver 6 sequentially supplies the scan signals to the scan lines S1 to Sn in accordance with control signals from a timing controller that is not shown.

The data driver 8 generates the data signals in accordance with the control signals from the timing controller and supplies the generated data signals to the data lines D1 to Dm in synchronization with the scan signals.

The conventional LCD is obtained by attaching an upper substrate and a lower substrate to each other. As illustrated in FIG. 2, an integrated circuit 10 is mounted on a lower substrate 12 of the LCD used for a portable device (for example, a mobile telephone). The circuits of the scan driver 6 and the data driver 8 are included in the integrated circuit 10. Therefore, the integrated circuit 10 is commonly connected to the data lines D1 to Dm and the scan lines S1 to Sn.

Pixels (not shown) are arranged in a matrix in an effective display region 20 of the lower substrate 12. The data lines D1 to Dm formed in the effective display region 20 are electrically connected to the integrated circuit 10 to receive the data signals from the integrated circuit 10. On the other hand, first pads 14 are formed on a first side of the effective display region 20 and second pads 16 are formed on a second side of the effective display region 20 opposite the first side. The first pads 14 are positioned near an upper side of the effective display region 20 and are electrically connected to the integrated circuit 10, and the second pads 16 are positioned near a lower side of the effective display region 20 and are electrically connected to the integrated circuit 10. When an upper substrate that is not shown and the lower substrate 12 are attached to each other or coupled together, the first pads 14 are electrically connected to the scan lines S1 to Sn/2 positioned in the upper part of the effective display region 20 of the upper substrate and the second pads 16 are electrically connected to the scan lines Sn/2+1 to Sn positioned in the lower part of the effective display region 20 of the upper substrate.

In the conventional LCD, the scan lines S1 to Sn and the data lines D1 to Dm are connected to the integrated circuit 10 and the effective display region 20 displays a predetermined image in response to the scan signals and the data signals supplied from the integrated circuit 10.

Dummy pads 18 are formed adjacent to the second pads 16. The dummy pads 18 are used for maintaining a gap when the upper substrate and the lower substrate 12 are attached to each other. This gap corresponds to a cell gap created by formation of liquid crystal cells between the two substrates. However, in the conventional LCD, spots are generated by difference in brightness in the parts where the dummy pads 18 are formed and/or on the boundaries between the dummy pads 18 and the second pads 16. The spots are generated by non-uniformity in the heights of the dummy pads 18 and the second pads 16 when the upper substrate and the lower substrate 12 are attached to each other.

SUMMARY OF THE INVENTION

Accordingly, it is an aspect of the present invention to provide a liquid crystal display (LCD) capable of preventing spots from being generated by difference in brightness.

According to a first aspect of the present invention, there is provided an LCD obtained by attaching or coupling an upper substrate and a lower substrate together. The LCD includes a first pad unit positioned on a first upper side, or a first upper corner, of the lower substrate, a second pad unit positioned on a second lower side, or a second lower corner, of the lower substrate, the first upper corner and the second lower corner located diagonally opposite each other, an integrated circuit electrically connected to the first pad unit and the second pad unit, and dummy pads positioned on a second upper side, or on the other upper corner, of the lower substrate. The dummy pads are substantially symmetrical to the second pads with respect to a line of symmetry dividing the lower substrate into an upper portion and a lower portion.

In one embodiment, the dummy pads are not electrically connected to the integrated circuit. The LCD further includes data lines formed in an effective display region of the lower substrate to be electrically connected to the integrated circuit. The effective display region may also be called the display region. The first pad unit and the second pad unit are positioned outside the effective display region. The LCD further includes a third pad unit positioned on the upper substrate to be electrically connected to the first pad unit, a fourth pad unit positioned on the upper substrate to be electrically connected to the second pad unit, and scan lines formed in the effective display region of the upper-substrate to be electrically connected to the third pad unit and the fourth pad unit. The LCD further includes pixels positioned in the areas where the scan lines and the data lines cross over one another to display images corresponding to data signals supplied from the data lines.

One embodiment includes a liquid crystal display having a first substrate and a second substrate coupled to and facing the first substrate. The first substrate includes a first display region, first pads, second pads, dummy pads and an integrated circuit. The second substrate includes a second display region facing the first display region, third pads electrically connected to the first pads and the fourth pads electrically connected to the second pads. The dummy pads are adapted to maintain a cell gap substantially uniform.

BRIEF DESCRIPTION OF THE DRAWINGS

These and/or other aspects and features of the invention will become apparent and more readily appreciated from the following description of the exemplary embodiments, taken in conjunction with the accompanying drawings of which.

DETAILED DESCRIPTION

Hereinafter, exemplary embodiments of the present invention will be described with reference to the accompanying drawings.

Figure 1:
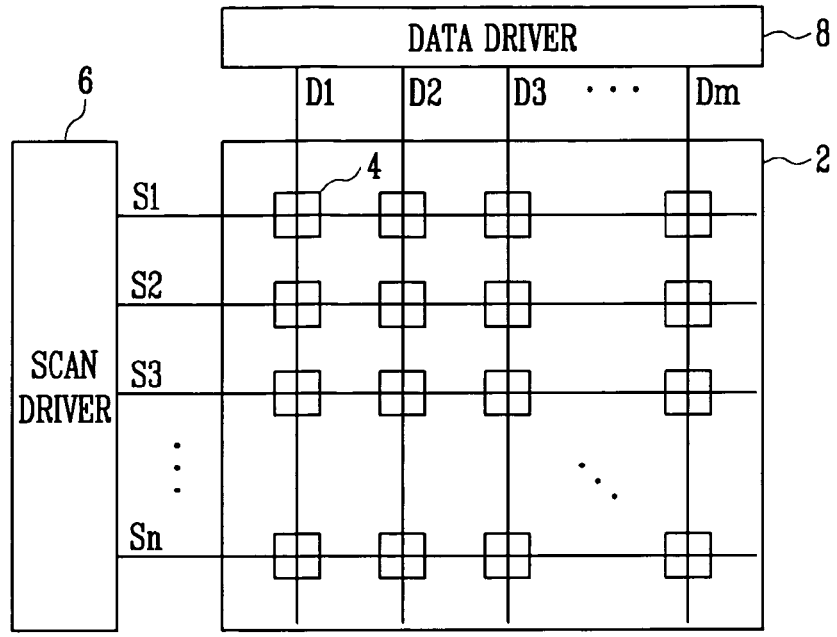
FIG. 1 illustrates a conventional passive matrix liquid crystal display (LCD)
Figure 2:
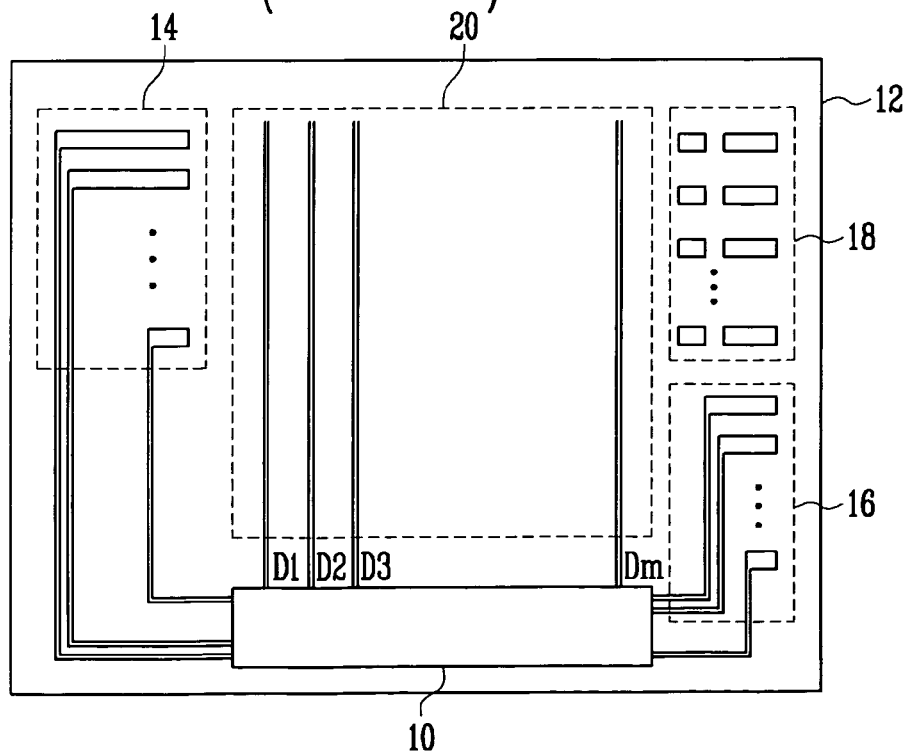
FIG. 2 illustrates a lower substrate of the conventional LCD.
Figure 3:
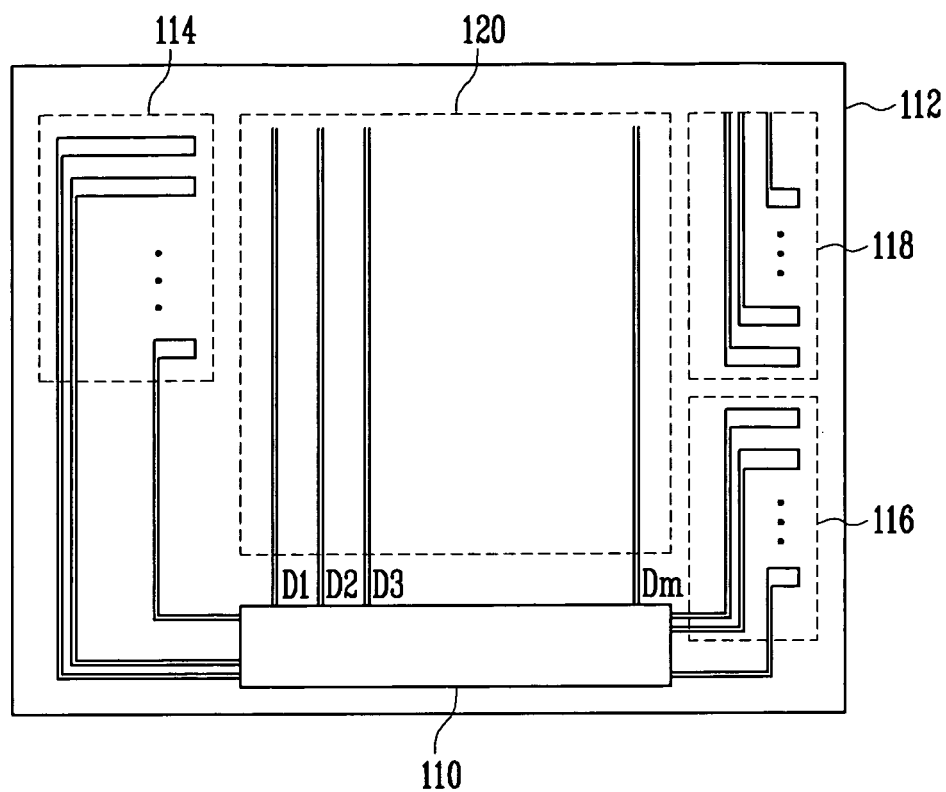
FIG. 3 illustrates a lower substrate of an LCD according to an embodiment of the present invention.
Figure 4:
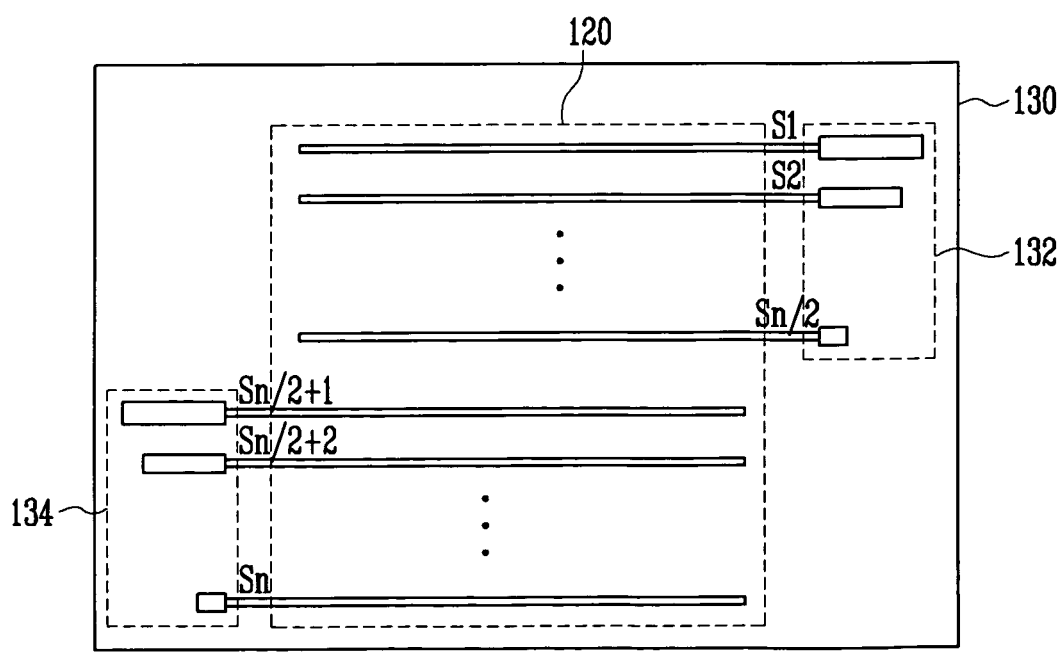
FIG. 4 illustrates an upper substrate of the LCD according to the embodiment of the present invention.

FIGS. 3 and 4 schematically illustrate the lower substrate and the upper substrate of a passive matrix liquid crystal display (LCD) according to an embodiment of the present invention. The lower substrate and the upper substrate shown in FIGS. 3 and 4 may be used in the LCD of FIG. 6.

Referring to FIGS. 3 and 4, the lower substrate 112 of the LCD according to one embodiment of the present invention includes an effective display region 120, an integrated circuit 110, first pads 114, second pads 116, and dummy pads 118. The effective display region 120 may also be referred to as the display region. The first pads 114, the second pads 116, and the dummy pads 118 may be respectively located in a first pad unit, a second pad unit, and a dummy pad unit.

Pixels 40 (shown in FIG. 6) are located in the effective display region 120 where the data lines D1 to Dm cross over scan lines S1 to Sn. The pixels are selected when scan signals are supplied to the scan lines S1 to Sn to display images corresponding to data signals supplied from the data lines D1 to Dm.

The data lines D1 to Dm are formed in the effective display region 120 and are electrically connected to the integrated circuit 110 positioned under the effective display region 120. The data lines D1 to Dm receive the data signals from the integrated circuit 110.

The first pads 114 are formed outside the effective display region 120. In one embodiment, the first pads 114 are formed near or adjacent to a first upper side, or corner of the lower substrate 112. The first pads 114 are electrically connected to the integrated circuit 110 to receive the scan signals from the integrated circuit 110. The first pads 114 are electrically connected to third pads 132 formed on an upper substrate 130 when the lower substrate 112 is coupled to the upper substrate 130. In the embodiment shown, since the third pads 132 are electrically connected to the scan lines S1 to Sn/2 formed near the upper end, or the upper half, of the effective display region 120, the scan signals supplied from the integrated circuit 110 are sequentially supplied to the scan lines S1 to Sn/2.

The second pads 116 are formed outside the effective display region 120. In one embodiment, the second pads 116 may be formed on a second lower side, or corner, of the lower substrate 112. This second lower corner is located diagonally opposite the first upper corner where the first pads 114 are formed. The second pads 116 are electrically connected to the integrated circuit 110 to receive the scan signals from the integrated circuit 110. The second pads 116 are electrically connected to fourth pads 134 formed on the upper substrate 130 when the lower substrate 112 is coupled to the upper substrate 130. In the embodiment shown, since the fourth pads 134 are electrically connected to the scan lines Sn/2+1 to Sn formed near the lower end, or lower half, of the effective display region 120, the scan signals supplied from the integrated circuit 110 are sequentially supplied to the scan lines Sn/2+1 to Sn.

The third pads 132 and the fourth pads 134 are formed on the upper substrate 130. The third pads 132 are electrically connected to the scan lines S1 to Sn/2 formed in the upper end, or upper half, of the effective display region 120 of the upper substrate 130. The third pads 132 are electrically connected to the first pads 114 when the upper substrate 130 and the lower substrate 112 are attached to each other or coupled together. Therefore, the third pads 132 supply the scan signals supplied from the integrated circuit 110 to the scan lines S1 to Sn/2.

The fourth pads 134 are electrically connected to the scan lines Sn/2+1 to Sn formed near the lower end, or lower half, of the effective display region 120 of the upper substrate 130. The fourth pads 134 are electrically connected to the second pads 116 when the upper substrate 130 and the lower substrate 112 are attached to each other. Therefore, the fourth pads 134 supply the scan signals supplied from the integrated circuit 110 to the scan lines Sn/2+1 to Sn.

Figure 5:
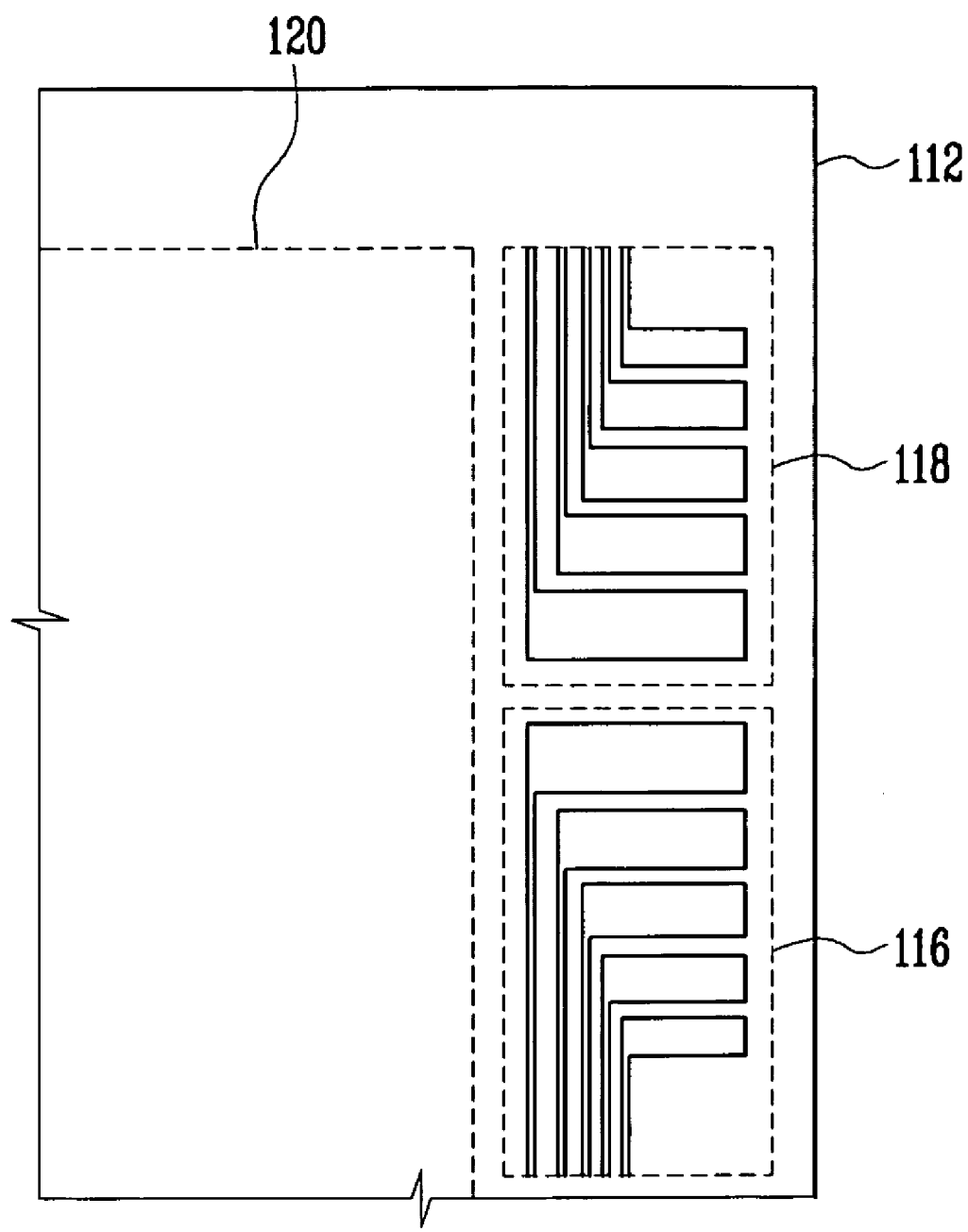
FIG. 5 illustrates a dummy unit of the lower substrate illustrated in FIG. 3.

In the LCD according to the embodiments of the present invention, the dummy pads 118 are formed in a region adjacent to the second pads 116. The dummy pads 118 are used for maintaining a substantially uniform gap (e.g., cell gap) when the upper substrate 130 and the lower substrate 112 are attached to each other. Therefore, the dummy pads 118 are formed to be substantially symmetrical to the second pads 116. For example, in the embodiment shown in FIG. 5, the dummy pads 118 are positioned near or adjacent to the second upper side of the lower substrate 112 (e.g., near the upper right corner of the lower substrate 112 in the orientation shown in FIG. 5) to be substantially symmetrical with the second pads 116 positioned on the second lower side. As such, the dummy pads 118 formed on an upper corner of the lower substrate 112 on the same side. where the second pads 116 are located. Further, the dummy pads 116 are symmetrical with the second pads 118 with respect to a line of symmetry between the two pads 116 and 118 that substantially divides the lower substrate 112 into an upper portion and a lower portion. When the dummy pads 118 are symmetrical with the second pads 116, it is possible to maintain the gap substantially uniform when the upper substrate 130 and the lower substrate 112 are attached to each other. Therefore, it is possible to prevent spots from being generated by difference in brightness. On the other hand, since the dummy pads 118 are used for maintaining the gap uniform, electrical signals need not be supplied from the outside to these dummy pads.

As described above, in the LCD according to the embodiments of the present invention, the dummy pads positioned near or adjacent to an upper end of the effective display region are symmetrical with the pads positioned near or adjacent to a lower end of the effective display region so that it is possible to maintain the cell gap substantially uniform between the upper substrate and the lower substrate and to thus prevent spots from being generated by difference in brightness.

Figure 6:
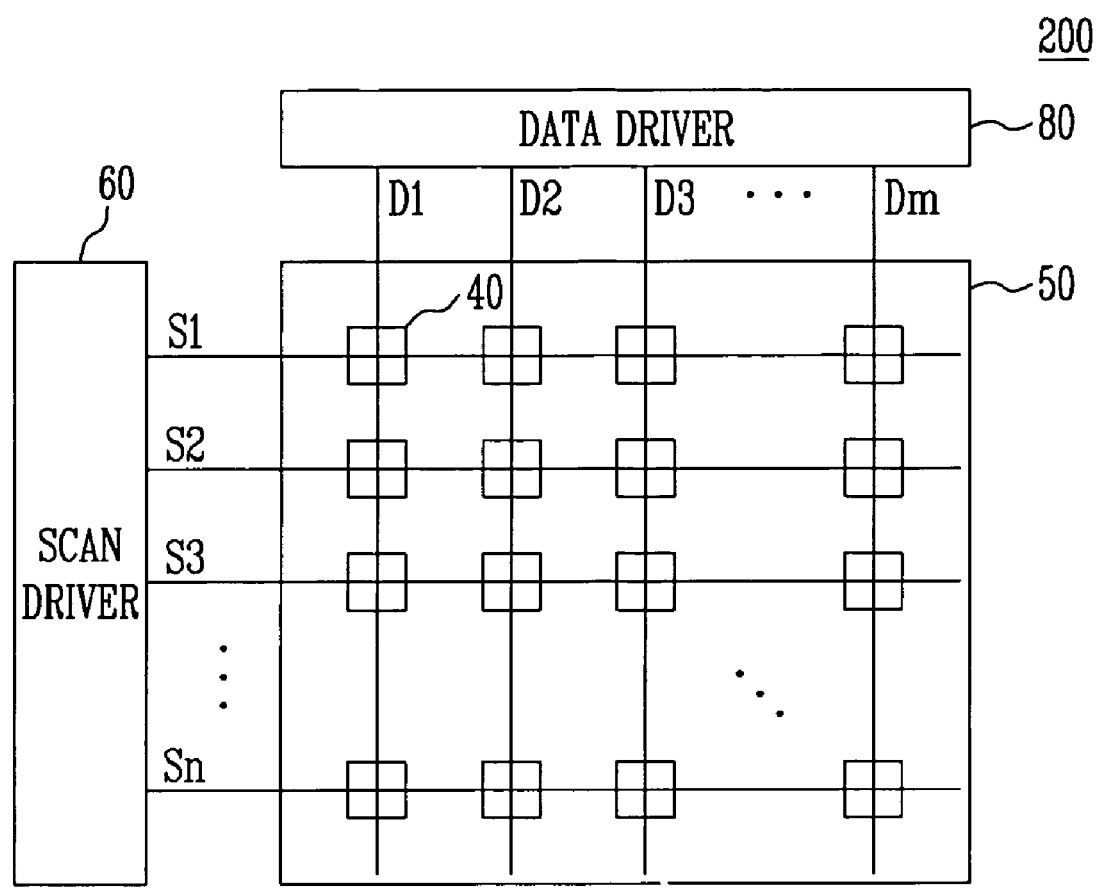
FIG. 6 illustrates a passive matrix LCD according to the embodiment of the present invention.

FIG. 6 illustrates a passive matrix LCD 200 of an embodiment of the present invention. The passive matrix LCD 200 includes a liquid crystal panel 50, a data driver 80 for driving data lines D1 to Dm of the liquid crystal panel 50, and a scan driver 60 for driving scan lines S1 to Sn of the liquid crystal panel 50. The liquid crystal panel 50 includes the pixels 40 positioned where the scan lines S1 to Sn and the data lines D1 to Dm cross over one another. The passive matrix LCD 200 is obtained by coupling the upper substrate 130 to the lower substrate 112.

Although certain exemplary embodiments of the present invention have been shown and described, it would be appreciated by those skilled in the art that changes might be made to these embodiments without departing from the principles and spirit of the invention, the scope of which is defined in the claims and their equivalents.

What is claimed is:

1. A liquid crystal display comprising:
an upper substrate;
a lower substrate facing the upper substrate;
first pads on the lower substrate adjacent a first corner of a display region of the lower substrate;
second pads on the lower substrate adjacent a second corner of the display region of the lower substrate diagonally opposite the first corner;
an integrated circuit electrically connected to the first pads and the second pads; and
dummy pads on the lower substrate adjacent a third corner of the display region of the lower substrate,
wherein the dummy pads are substantially symmetrical to the second pads with respect to a line of symmetry between the second pads and the dummy pads.

2. The liquid crystal display of claim 1, wherein the dummy pads are not electrically connected to the integrated circuit.

3. The liquid crystal display device of claim 1, further comprising data lines in the display region of the lower substrate and electrically connected to the integrated circuit.

4. The liquid crystal display device of claim 3, wherein the first pads and the second pads are outside the display region of the lower substrate.

5. The liquid crystal display device of claim 3, further comprising:
third pads on the upper substrate and electrically connected to the first pads;
fourth pads on the upper substrate and electrically connected to the second pads; and
scan lines in a display region of the upper substrate and electrically connected to the third pads and the fourth pads, the display region of the upper substrate corresponding to the display region of the lower substrate.

6. The liquid crystal display device of claim 5, further comprising pixels in areas where the scan lines cross the data lines for displaying images corresponding to data signals supplied from the data lines.

7. A liquid crystal display comprising:
a first substrate having a first display region, first pads adjacent a first corner of the first display region, second pads adjacent a second corner of the first display region diagonally opposite the first corner, dummy pads, and an integrated circuit;
a second substrate facing the first substrate, the second substrate having a second display region facing the first display region, third pads electrically connected to the first pads, and fourth pads electrically connected to the second pads,
wherein the dummy pads are adapted to maintain a substantially uniform cell gap.

8. The liquid crystal display of claim 7, wherein the dummy pads are substantially symmetrical to the second pads.

9. The liquid crystal display of claim 7, further comprising a plurality of data electrodes on the first substrate, extending in a first direction, and electrically connected to the integrated circuit.

10. The liquid crystal display of claim 9, wherein the integrated circuit is for supplying data signals for displaying an image to the data electrodes.

11. The liquid crystal display of claim 7, further comprising a first plurality of scan electrodes on the second substrate, extending in a second direction substantially perpendicular to the first direction, and electrically connected to the integrated circuit through the third pads and the first pads.

12. The liquid crystal display of claim 11, further comprising a second plurality of scan electrodes on the second substrate, extending in the second direction, and electrically connected to the integrated circuit through the fourth pads and the second pads.

13. The liquid crystal display of claim 12, wherein the integrated circuit is for supplying first and second scan signals to the first and second scan electrodes, respectively, to drive the liquid crystal display.

14. The liquid crystal display of claim 7, wherein the first pads and the second pads are located diagonally from each other on the first substrate.

15. The liquid crystal display of claim 7, wherein the third pads and the fourth pads are located diagonally from each other on the second substrate.

* * * * *